Patented July 31, 1945

2,380,403

UNITED STATES PATENT OFFICE 2,380,403

POLYMERIZATION OF CONJUGATED DIENE HYDROCARBONS

George L. Browning, Jr., William D. Stewart, and Benjamin M. G. Zwicker, Akron, Ohio, assignors, by mesne assignments, to The B. F. Goodrich Company, Akron, Ohio, a corporation of New York No Drawing. Application May 31, 1941,
Serial No. 396,156

8 Claims. (Cl. 260—84.5)

This invention relates to the polymerization of butadiene hydrocarbons and particularly to a method whereby butadiene hydrocarbons may be polymerized in aqueous emulsion to form products closely resembling natural crude rubber.

It is disclosed in the copending application of Charles F. Fryling, Serial No. 396,155, filed May 31, 1941, that compounds containing a 2-thiothiazyl group modify the emulsion polymerization of butadiene hydrocarbons in such a manner that polymers more nearly resembling natural rubber are produced. We have discovered that an additional effect is obtained by conducting the polymerization in the presence of a small amount of a simple ionizable nickel salt, namely that the time required to form a homogenous sheet when the polymer is worked on a roll mill, herein called the "breakdown" time, is greatly shortened. This effect is not obtained when the polymerization is effected in the presence of certain other well-known modifiers, or when certain other simple ionizable salts of certain other heavy metals are employed.

Any modifier containing the 2-thiothiazyl group which may be represented by the following structural formula:

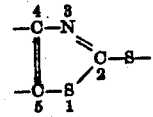

may be employed. Preferred modifiers include the aliphatic 2-mercaptothiazoles, by which is meant compounds in which the carbon atoms numbered 4 and 5 do not form part of an unsaturated carbocyclic ring, such as 2-mercapto-4-ethylthiazole, 2-mercapto-4-phenylthiazole, 2-mercapto-4,5-dimethylthiazole, 2 - mercapto - 4 - methoxymethylthiazole, and the corresponding bis-thiazyl-2 mono-, di-, and polysulfides, the aliphatic bis-thiazyl-2 disulfides producing especially good results. Other compounds which may be employed, but which do not in general possess as great activity as the aliphatic-2-mercapto-thiazoles include the aromatic thiazoles, by which is meant compounds in which the carbon atoms numbered 4 and 5 form part of an unsaturated carbocyclic ring, such as 2-mercaptobenzothiazole, 2-mercapto-naphthothiazole, and the corresponding aromatic bis-thiazyl-2 mono-, di-, and polysulfides. 2-thiazyl sulfides such as 4,5-dimethylthiazyl-2 diethylamino sulfide, benzothiazyl-2 dicyclohexylamino sulfide, and other compounds containing the 2-thiazyl group may also be employed.

The proportion in which the 2-thiothiazyl compound is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or over may advantageously be employed.

By the term "simple ionizable nickel salt" is meant the simple inorganic or organic salts which yield ions in aqueous solution. The salt need not be completely or even moderately soluble in water in order to be employed since even relatively insoluble salts are known to ionize to a limited extent. The term "simple ionizable salts" distinguishes from complex compounds in which the nickel is united to other elements in the compound by coordinated covalences and is meant to include only those compounds in which the metal exerts its primary positive valences.

Among the simple ionizable nickel salts which may be employed may be mentioned the chlorides, bromides, nitrates, sulfates, carbonates, borates, acetates, sulfites, thiosulfates, cyanides, and sulfides, the water-soluble salts including the halides, sulfates, and nitrates being preferred. It is generally desirable to employ the nickel salt in amounts not greater than .1% based on the monomers, although this is not a critical value, and amounts as great as 1% and more may be used in some instances, some systems exhibiting a greater tolerance towards excess nickel salt than others. The use of too great amounts of nickel salt will increase the time required for the polymerization to reach completion.

As a specific example of the method of this invention, 55 parts by weight of butadiene and 45 parts of acrylonitrile were copolymerized at 30° C. in the presence of about 250 parts of a 3% solution of fatty acid which had been 85% neutralized with sodium hydroxide, 0.35 part of hydrogen peroxide as an initiator, and 1 part of 2-mercapto-4,5-dimethylthiazole as a modifier. By coagulation of the latex-like product of the polymerization, a coherent, plastic material was obtained. It was found that it required 13 minutes before the polymer formed a coherent, plastic sheet on a roll mill. When the polymerization was performed in the presence of 0.01 part of nickel sulfate, however, a soft, plastic polymer which had a breakdown time of only 5 minutes was obtained.

The modifying agents of this invention may be employed in the polymerization in aqueous emulsion of butadiene hydrocarbons such as butadiene, 2,3-dimethylbutadiene, isoprene, or piperylene either alone or in admixture with each other or with other monomers copolymerizable therewith.

As examples of monomers copolymerizable with butadiene hydrocarbons may be mentioned such compounds as styrene, vinyl naphthalene, acrylonitrile, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These monomers are preferably employed in smaller amounts than the butadiene hydrocarbons.

The polymerization of the above materials in aqueous emulsion may be effected by various initiators of polymerization such as per-compounds including per-acids, peroxides, and per-salts such as persulfates, perborates, percarbonates, and the like, as well as other types of initiators such as diazoaminobenzene, and dipotassium diazomethane disulfonate.

Any of the ordinary emulsifying agents such as fatty acid soaps including sodium oleate and sodium stearate, hymolal sulfates and aryl sulfonates including sodium lauryl sulfate and sodium isopropyl naphthalene sulfonate, and salts of organic bases containing long carbon chains such as the hydrochloride of diethylaminoethyloleylamide, trimethylcetylammonium methyl sulfate, etc., may be employed in the polymerization.

The terms "butadiene hydrocarbons" and "a butadiene hydrocarbon" signify butadiene-1,3 and its homologues which enter into polymerization reactions in substantially the same manner. The term "sulfide" is a generic term including the mono-, di-, and polysulfides.

Although we have herein disclosed specific embodiments of our invention, we do not intend to limit the invention solely thereto, for it will be obvious to those skilled in the art that many variations and modifications are within the spirit and scope of the invention as defined in the appended claims.

We claim:
1. The method which comprises polymerizing a conjugated butadiene hydrocarbon in the form of an aqueous emulsion in the presence of a compound containing the 2-thiothiazyl group and a simple ionizable nickel salt.

2. The method which comprises polymerizing a conjugated butadiene hydrocarbon in the form of an aqueous emulsion in the presence of a 2-mercaptothiazole and a water-soluble nickel salt.

3. The method which comprises copolymerizing in the form of an aqueous emulsion butadiene and a smaller amount of a monomer copolymerizable therewith in aqueous emulsion in the presence of a 2-mercaptothiazole and less than 0.1% based on the materials polymerized of a water-soluble nickel salt.

4. The method which comprises copolymerizing butadiene and acrylonitrile in the form of an aqueous emulsion in the presence of an aliphatic 2-mercaptothiazole and less than 0.1% based on the materials polymerized of a water-soluble nickel salt.

5. The method of claim 4 in which 2-mercapto-4,5-dimethyl thiazole is employed.

6. The method which comprises polymerizing a conjugated butadiene hydrocarbon in the form of an aqueous emulsion in the presence of a bis-thiazyl-2 sulfide and less than 0.1% based on the material polymerized of a water-soluble nickel salt.

7. The method which comprises copolymerizing butadiene and acrylonitrile in the form of an aqueous emulsion in the presence of an aliphatic bis-thiazyl-2 disulfide and less than 0.1% based on the materials polymerized of a water-soluble nickel salt.

8. The method which comprises polymerizing a conjugated butadiene hydrocarbon in the form of an aqueous emulsion in the presence of a compound containing the 2-thiothiazyl group and less than 0.1% based on the material polymerized of nickel sulfate.

GEORGE L. BROWNING, JR.
WILLIAM D. STEWART.
BENJAMIN M. G. ZWICKER.